US008165775B2

(12) United States Patent
Nakamura

(10) Patent No.: US 8,165,775 B2
(45) Date of Patent: Apr. 24, 2012

(54) SYSTEM AND METHOD FOR CONTROLLING RUNNING OF A VEHICLE

(75) Inventor: Masahide Nakamura, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 911 days.

(21) Appl. No.: 12/183,302

(22) Filed: Jul. 31, 2008

(65) Prior Publication Data
US 2009/0037070 A1 Feb. 5, 2009

(30) Foreign Application Priority Data

Aug. 3, 2007 (JP) ................................. 2007-203231

(51) Int. Cl.
B60T 7/12 (2006.01)
(52) U.S. Cl. ................................. 701/96; 701/93; 701/72
(58) Field of Classification Search .................... 701/65, 701/70, 72, 93, 96; 340/52, 467
See application file for complete search history.

(56) References Cited

U.S. PATENT DOCUMENTS

| 6,208,927 B1 * | 3/2001 | Mine et al. ........................ 701/70 |
| 6,298,296 B1 * | 10/2001 | Takahashi ........................ 701/70 |
| 6,343,253 B1 * | 1/2002 | Matsuura et al. ................ 701/70 |
| 6,401,023 B1 * | 6/2002 | Takahashi ........................ 701/70 |
| 6,725,145 B1 * | 4/2004 | Takahashi ........................ 701/70 |
| 7,957,877 B2 * | 6/2011 | Makiyama ........................ 701/72 |
| 2002/0161510 A1 * | 10/2002 | Matsuura ........................ 701/200 |
| 2003/0130779 A1 * | 7/2003 | Shiimado et al. ................ 701/65 |
| 2003/0130780 A1 * | 7/2003 | Shiimado et al. ................ 701/65 |
| 2003/0163238 A1 * | 8/2003 | Matsumoto et al. ............ 701/70 |
| 2003/0204299 A1 * | 10/2003 | Waldis et al. .................... 701/96 |
| 2004/0111209 A1 * | 6/2004 | Kagawa et al. .................. 701/93 |
| 2005/0085985 A1 * | 4/2005 | Suzuki et al. .................... 701/70 |
| 2005/0216161 A1 * | 9/2005 | Sakugawa ........................ 701/70 |
| 2007/0078584 A1 * | 4/2007 | Nakamura et al. .............. 701/93 |
| 2007/0106445 A1 * | 5/2007 | Suzuki et al. .................... 701/70 |
| 2007/0233365 A1 * | 10/2007 | Sekine ............................ 701/200 |

FOREIGN PATENT DOCUMENTS

| EP | 0 901 929 A1 | 3/1999 |
| EP | 1 288 055 A2 | 3/2003 |
| EP | 1 318 042 A2 | 6/2003 |
| EP | 1 403 835 A1 | 3/2004 |
| JP | 06-036187 | 2/1994 |
| JP | 2002-067734 | 3/2002 |
| JP | 2006-056371 | 3/2006 |

* cited by examiner

Primary Examiner — Helal A Algahaim
(74) Attorney, Agent, or Firm — Drinker Biddle & Reath LLP

(57) ABSTRACT

A vehicle driving control system and method which enables the vehicle can travel through each curve at the optimum speed on an ordinary road and also on a highway. The controller and method uses a car navigation system to detect road classification about the road ahead of where the vehicle is running under guidance. When the road is an ordinary road, the following with respect to the preceding vehicle is given priority; when the road is a highway, the target vehicle speed obtained from the navigation information of car navigation system and the vehicle speed in the following mode are compared with each other, and the lower vehicle speed is selected (select-low) under control. As a result, it is possible to travel through the curves at a reliable speed not only on ordinary roads, but also on highways.

15 Claims, 10 Drawing Sheets

WHEN A CURVE IS DETECTED AHEAD OF THE VEHICLE RUNNING AT A PRESET VEHICLE SPEED, AND THE TARGET VEHICLE SPEED COMMAND VALUE IS LOWER THAN THE ACTUAL VEHICLE SPEED, THE WARNING ON FLAG IS SET, AND A WARNING IS ISSUED.

WHEN A CURVE IS DETECTED AHEAD OF THE VEHICLE RUNNING AT A PRESET VEHICLE SPEED, AND THE TARGET VEHICLE SPEED COMMAND VALUE IS LOWER THAN THE ACTUAL VEHICLE SPEED, THE DECELERATION CONTROL ON FLAG IS SET, AND DECELERATION CONTROL IS PERFORMED.

FOLLOWING PRIORITY WHEN
RUNNING ON AN ORDINARY ROAD

SELECT-LOW WHEN RUNNING ON A HIGHWAY

SYSTEM AND METHOD FOR CONTROLLING RUNNING OF A VEHICLE

CROSS-REFERENCE TO RELATED APPLICATIONS

This application claims priority to Japanese Patent Application No. 2007-203231 filed Aug. 3, 2007, which is incorporated by reference herein in the entirety.

BACKGROUND OF THE INVENTION

1. Field of the Invention

The present invention relates to a system and method for controlling running of a vehicle using a car navigation system, such as an automobile route guiding system. More particularly, the present invention relates to a system and method for controlling running of a vehicle based on the state of the road curves ahead of the vehicle.

2. Description of Related Art

Car navigation systems employed on many automobiles can detect the current travel position of the vehicle and can compute the travel route for guiding the vehicle from the current position to the target arrival position using the map information and GPS functionality or the like. In addition, in recent years, many control technologies have been proposed that perform combined control of the speed of the vehicle by means of the car navigation system functions.

For example, as described in Japanese Kokai Patent Application No. Hei 6[1994]-36187, when a curve in the road ahead of where the vehicle travels is detected, the target vehicle speed for the vehicle when passing through the curve is computed from the magnitude of the curve. Based on the computed target vehicle speed, the target deceleration for realizing the target vehicle speed is computed. When it is determined that the vehicle is traveling too fast, the vehicle is decelerated under control before reaching the curve, so that the vehicle can pass through the curve at the optimum speed.

Usually, the map information stored in conventional navigation systems pertaining to the position and shape of curves is relatively accurate. However, for some roads the accuracy is low and differs significantly from the actual road conditions.

BRIEF SUMMARY OF THE INVENTION

The present invention has been developed in order to solve the aforementioned subject matter efficiently. Accordingly, an object of the present invention is to provide a system and method for controlling running of a vehicle that takes into consideration the difference between roads for which map information has lower accuracy and roads for which map information has higher accuracy, so that the vehicle can travel through each curve at the optimum speed for any type of road.

In order to solve the aforementioned subject matter, an embodiment of the present invention provides a road classification detector that detects road classification for the road ahead of the vehicle, and a deceleration controller that changes the vehicle deceleration control quantity or the deceleration control set value according to the road classification detected by the road classification detector. Consequently, for ordinary roads, for which there are significant discrepancies between the curve location and shape obtained from the navigation information of the car navigation system and that of the actual curve, it is possible to travel through the curve at a reliable speed with the discrepancies being taken into consideration by setting a larger deceleration control quantity or deceleration control set value.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Exemplary embodiments of the present invention will now be explained in detail with reference to the drawings.

Figure 1:
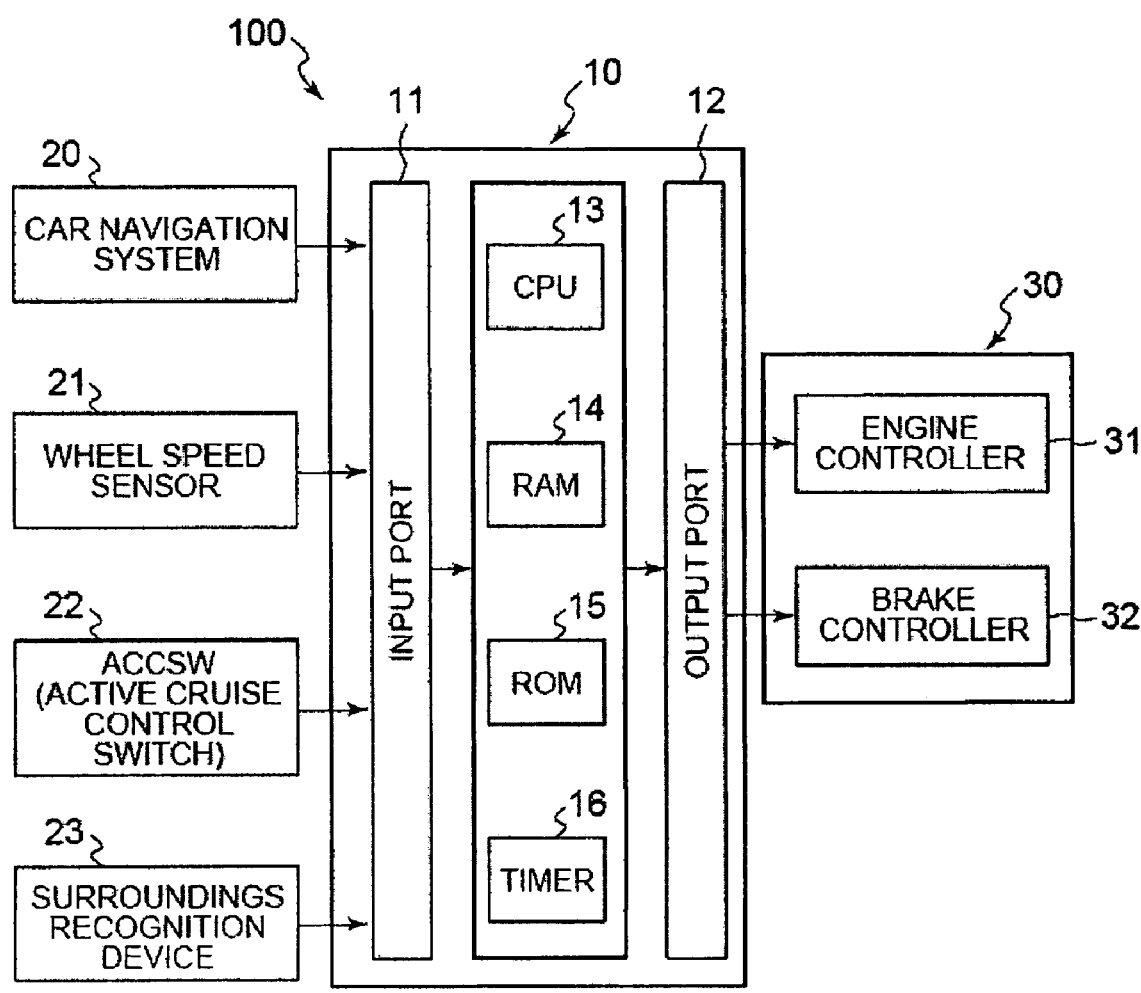
FIG. 1 is a block diagram illustrating an example of the basic concept of the vehicle running controller according to an embodiment of the present invention.

FIG. 1 is a diagram illustrating an example of a vehicle running controller 100 according to an embodiment of the present invention. As shown, the vehicle running controller 100 comprises controller 10, car navigation system 20, wheel speed sensor 21 (e.g., wheel speed detecting means), ACCSW 22, surroundings recognition device 23 (e.g., preceding vehicle following means), and acceleration/deceleration controller 30 (e.g., acceleration/deceleration control means).

The controller 10 includes an information processing system (e.g., a microcomputer system) that comprises input port 11, output port 12, CPU 13, RAM 14, ROM 15, and timer 16, for example. The output signals from car navigation system 20, wheel speed sensor 21, active cruise control switch (ACCSW) 22, surroundings recognition device 23 or another external device is input to input port 11 for arithmetic and logic operations, and the arithmetic and logic operation result is output from output port 12 to acceleration/deceleration controller 30 comprising engine controller 31 and brake controller 32 or the like to perform combined control operations based on the result.

In this example, the car navigation system 20 can have the same or substantially the same construction and operations as those of the conventional system. The car navigation system 20 can detect the current travel position of the vehicle based on map information stored in a CD-ROM, DVD-ROM, HDD or another high capacity storage medium, or on GPS functionality, a gyro sensor, etc., and computes the optimum travel route from the current position to the target arrival position and provides a function for guiding the vehicle. In this example, the car navigation system 20 inputs various types of navigation information, including the travel position of the vehicle and node information for the upcoming curve on in the road on which the vehicle runs, based on the map information and the travel route information, to controller 10.

The wheel speed sensor 21 in this example is provided for both front wheels and rear wheels of the vehicle to measure wheel speed pulses from the front/rear wheels, and the measurement signals are input in real time to controller 10. The ACCSW 22, for example, is an operation switch for operating device 100 that is attached to the steering wheel or instrument panel of the vehicle. The switch state is detected, and the detection signals are input in real time to controller 10 or the like.

For example, surroundings recognition device 23 may include millimeter wave radar or laser radar that forms part of an inter-vehicle automatic control system known as ACC (Adaptive Cruise Control) or the like. Device 23 detects a preceding vehicle running directly in front of the vehicle, and the detection signal is input in real time to controller 10 so that it is possible to control the operation of the vehicle for following the preceding vehicle, as will be explained later.

Figure 2:
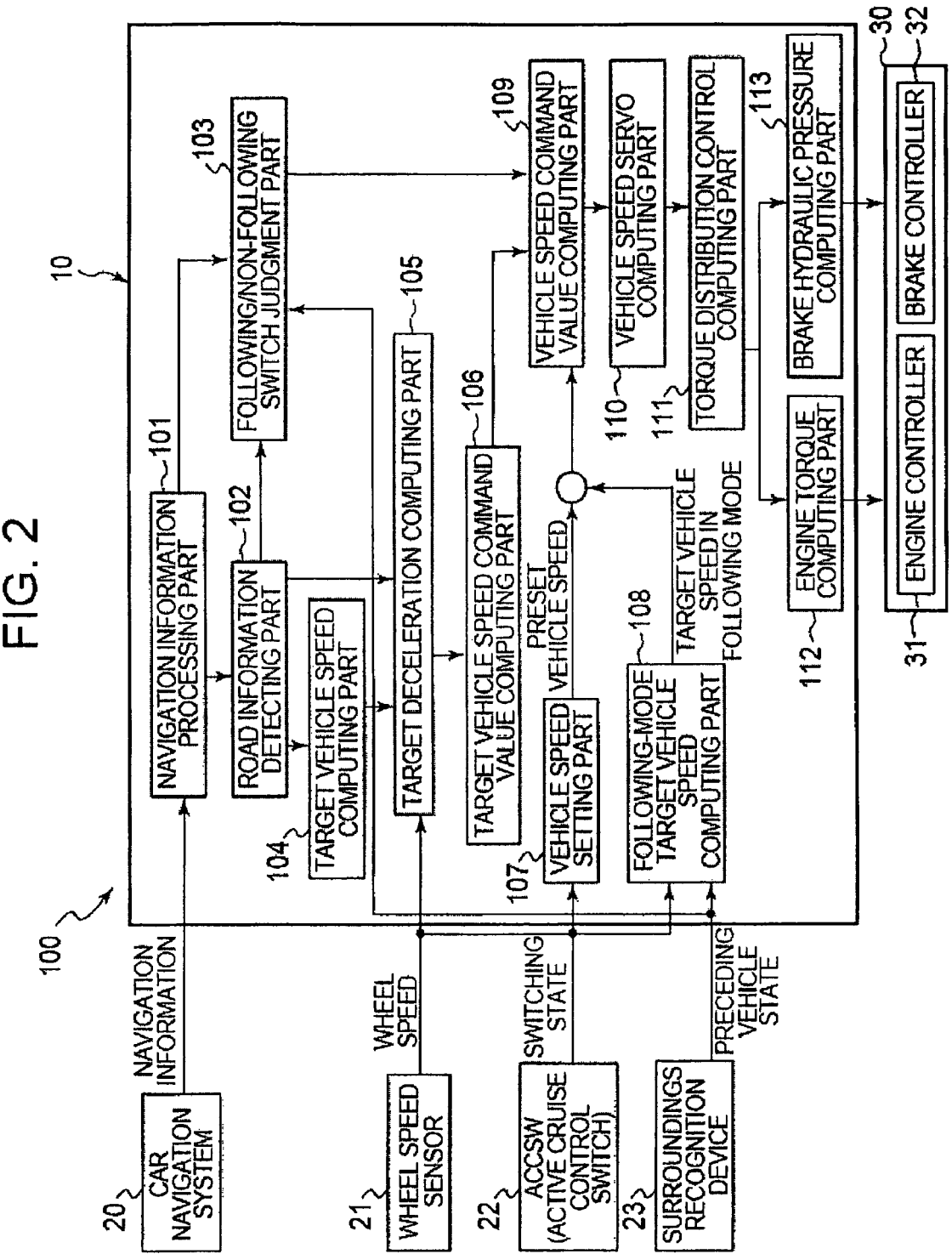
FIG. 2 is a block diagram illustrating an example of the function of the vehicle running controller according to an embodiment of the present invention.

FIG. 2 is a block diagram illustrating an example of the function of controller 10 that operates based on the signals input from the various systems and devices. As shown, the controller 10, which includes the information processing system, performs the various functions of navigation information processing part 101 (e.g., a curved state detecting means), road information detecting part 102 (e.g., road information detecting means), following/non-following switch judgment part 103, target vehicle speed computing part 104 (e.g., a target vehicle speed computing means), target deceleration computing part 105 (e.g., a target deceleration computing means), target vehicle speed command value computing part 106 (e.g., target vehicle speed command value computing means), vehicle speed setting part 107, following-mode target vehicle speed computing part 108, vehicle speed command value computing part 109, vehicle speed servo computing part 110, torque distribution control computing part 111, engine torque computing part 112, and brake hydraulic pressure computing part 113.

Also, the "preceding vehicle following means" (e.g., surroundings recognition device 23) can, for example, correspond to an inter-vehicle automatic control system (ACC) realized by means of surroundings recognition device 23 or ACCSW 22, following-mode target vehicle speed computing means 108, vehicle speed command value computing part 109, vehicle speed servo computing part 110, torque distribution control computing part 111, engine torque computing part 112, brake hydraulic pressure computing part 113, acceleration/deceleration controller 30, engine controller 31, etc. shown in FIG. 2. That is, the "preceding vehicle following means" detects the presence/absence of a preceding vehicle traveling in front of the vehicle. If a preceding vehicle is detected, the following target vehicle speed for following of the preceding vehicle by the vehicle is computed. Then, the vehicle speed command value for controlling the vehicle speed is selected based on the target vehicle speed command value computed by the target vehicle speed command value computing means, the vehicle speed setting computed by the vehicle speed setting computing means, and the following-mode target vehicle speed, and vehicle speed control is performed based on the selected vehicle speed command value.

Based on the navigation information (e.g., node information (map information), road type, link type, and so on) obtained from car navigation system 20, the navigation information processing part 101 detects the presence/absence of a curve from the node point ahead on the road where the vehicle travels, as well as data pertaining to the turning radius, turning direction, and other curve state values at each node point on the curve, and outputs the detected values to road information detecting part 102 and following/non-following switch judgment part 103. The road information detecting part 102 detects the road information from the information pertaining to the road ahead of the vehicle acquired from navigation information processing part 101, and outputs the road information to following/non-following switch judgment part 103, target vehicle speed computing part 104 and target deceleration computing part 105. At the same or substantially the same time, road information detecting part 102 outputs to target vehicle speed computing part 104 the various types of road curve information pertaining to the turning radius and turning direction at each node point on the road ahead of the vehicle.

When a preceding vehicle is detected based on the preceding vehicle state obtained from surroundings recognition device 23 and the road information for the road ahead of the vehicle obtained from road information detecting part 102, following/non-following switch judgment part 103 determines whether the vehicle is following the preceding vehicle, and outputs the judgment result to vehicle speed command value computing part 109. Based on the turning radius at each node point on the upcoming curve in the road where the vehicle runs computed by navigation information processing part 101 and the road information detected with road information detecting part 102, target vehicle speed computing part 104 sets the target vehicle speed for the upcoming curve and for each upcoming node point, and outputs the setting values to target deceleration computing part 105. Based on the target vehicle speed for the upcoming curve and at the various node points ahead of the vehicle that are set by target vehicle speed computing part 104, and on the speed of the vehicle obtained from wheel speed sensor 21, target deceleration computing part 105 computes the target deceleration required to reach the target vehicle speed for the upcoming curve and for the various upcoming node points, and at the same or substantially the same time detects the node point where the target deceleration becomes the minimum and the corresponding target deceleration among the computed target deceleration values, and outputs these to target vehicle speed command value computing part 106.

Based on the target deceleration having the minimum value at the various node points on the upcoming curve obtained in target deceleration computing part 105, target vehicle speed command value computing part 106 computes the target vehicle speed command value with an associated deceleration rate limiter, and outputs the obtained target vehicle speed command value to vehicle speed command value computing part 109. Vehicle speed setting part 107 sets the vehicle speed for low speed running based on the state of the operation switch obtained from ACCSW 22 and the vehicle speed obtained from wheel speed sensor 21, and at the same or substantially the same time outputs the vehicle speed setting to vehicle speed command value computing part 109. For example, when the set switch is pressed while the main ACC switch has been set, the actual vehicle speed at this time becomes the vehicle speed setting, and the vehicle performs low speed running at the set vehicle speed.

Following-mode target vehicle speed computing part 108 computes the following-mode target vehicle speed from the state of the preceding vehicle obtained from surroundings recognition device 23 and from the speed of the vehicle itself obtained from wheel speed sensors 21, and outputs the following-mode target vehicle speed to vehicle speed command value computing part 109. Based on the target vehicle speed command value computed with target vehicle speed command value computing part 106, the vehicle speed setting established by vehicle speed setting part 107, the following-mode target vehicle speed computed with following-mode target vehicle speed computing part 108, and the result of the judgment made by following/non-following switch judgment part 103, vehicle speed command value computing part 109 computes the vehicle speed command value and outputs this vehicle speed command value to vehicle speed servo computing part 110.

The vehicle speed servo computing part 110 performs braking/driving control of the vehicle so that the vehicle speed command value becomes that computed by vehicle speed command value computing part 109, and computes the target deceleration for realizing the vehicle speed command value and outputs the target acceleration/deceleration to torque distribution control computing part 111 in order to perform torque distribution corresponding to the target acceleration/deceleration. Based on the target acceleration/deceleration computed by vehicle speed servo computing part 110, the torque distribution control computing part 111 computes the torque distribution control values for the engine torque and braking torque, and at the same or substantially the same time, outputs the computed torque distribution control values to engine torque computing part 112 and brake hydraulic pressure computing part 113, respectively.

Engine torque computing part 112 computes the engine torque by means of the throttle opening for realizing the torque on the engine side allotted by torque distribution control computing part 111, and the command value is output to engine controller 31 of acceleration/deceleration controller 30. Brake hydraulic pressure computing part 113 computes the brake hydraulic pressure command value for realizing the torque on the brake side allotted by torque distribution control computing part 111, and the command value is output to brake controller 32 of acceleration/deceleration controller 30.

Figure 5:
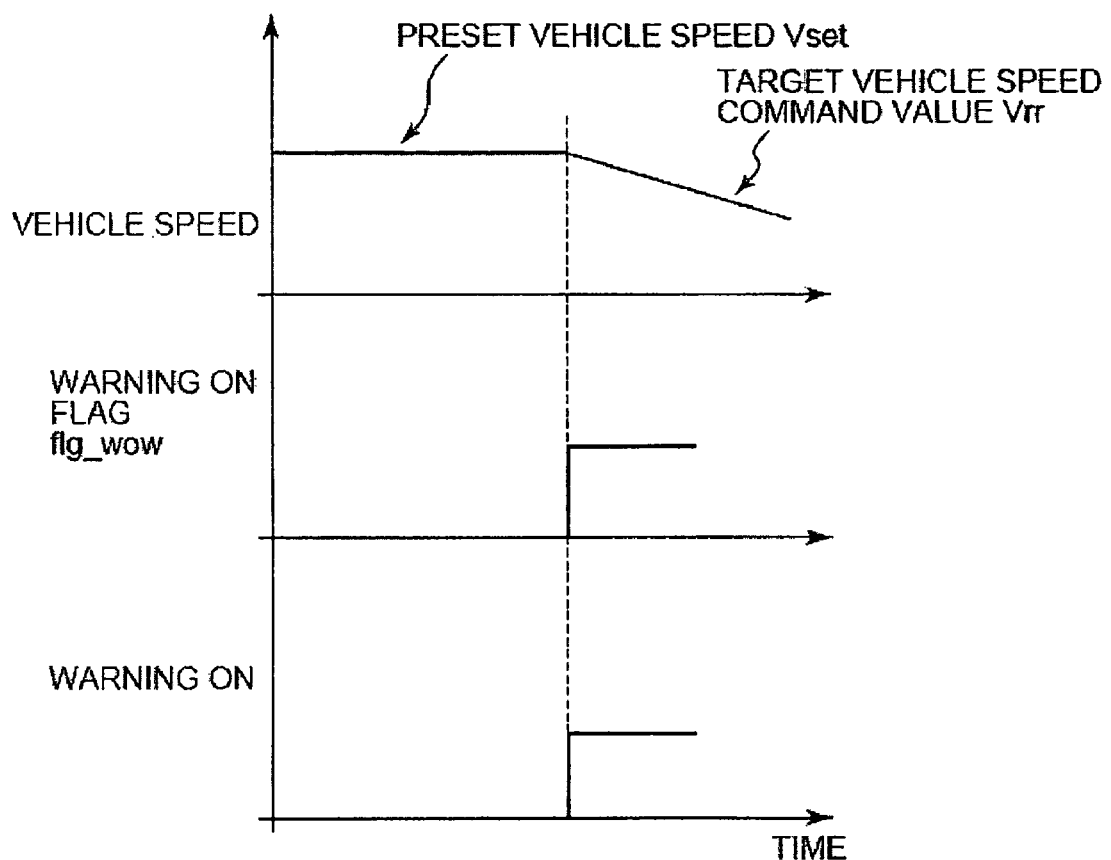
FIG. 5 is a diagram illustrating an example of the relationship between the target vehicle speed command value and the warning ON operation.
Figure 6:
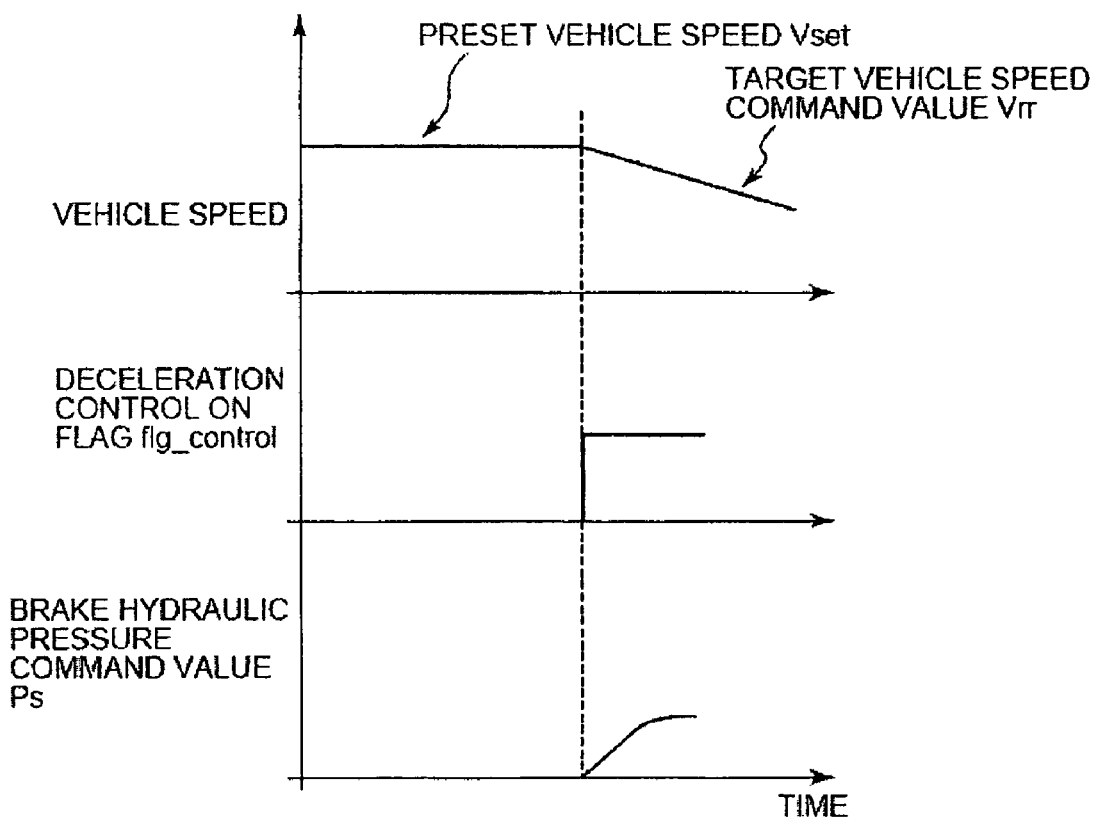
FIG. 6 is a diagram illustrating an example of the relationship between the target vehicle speed command value and the brake hydraulic pressure control value.
Figure 7:
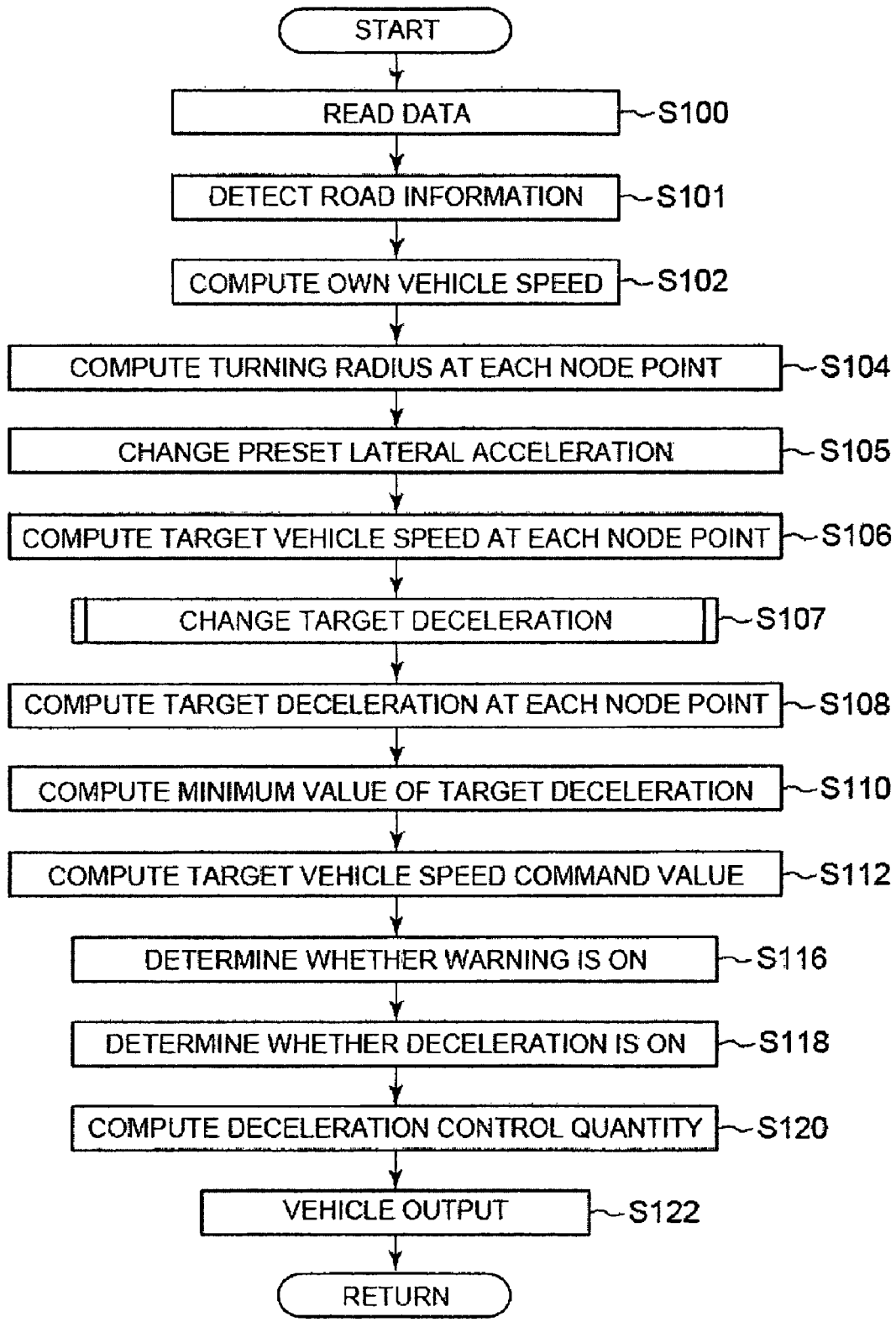
FIG. 7 is a flow chart an example of a vehicle running control method according to another embodiment of the present invention.
Figure 8:
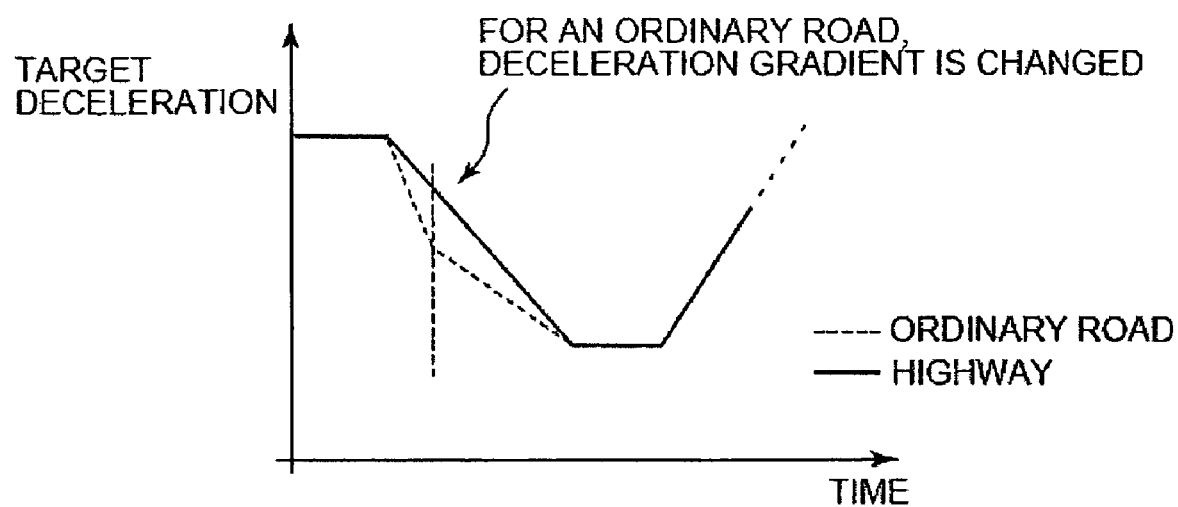
FIG. 8 is a diagram illustrating an example of the relationship between the target deceleration and time.
Figure 9:
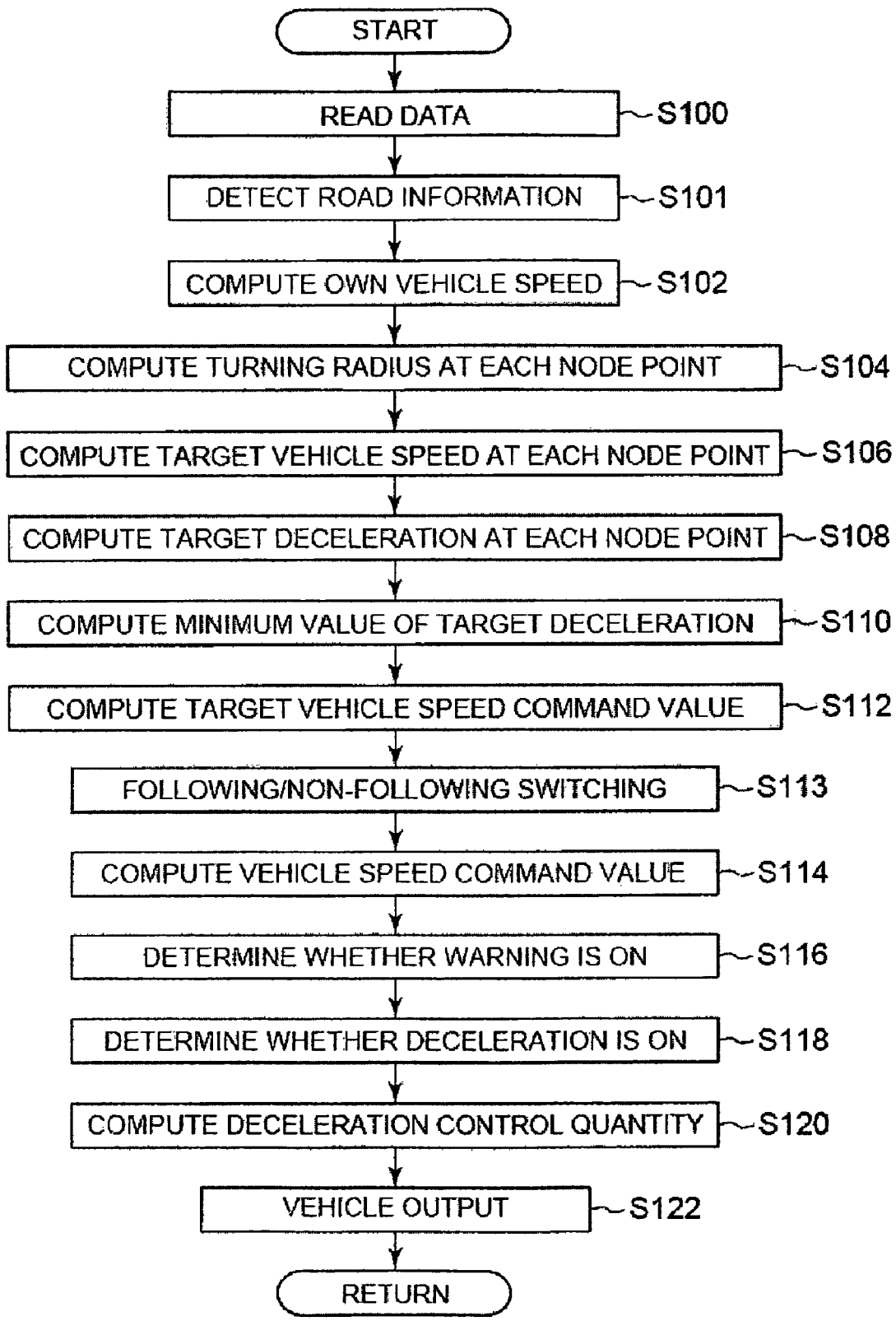
FIG. 9 is a flow chart illustrating an example of a vehicle running control method according to a further embodiment of the present invention.

An example of the vehicle running control method using the vehicle running controller 100 as described above will be explained with reference to the flow charts shown in FIGS. 3, 7 and 9, and the diagrams shown in FIGS. 4, 5, 6, 8, 10A and 10B.

Figure 3:
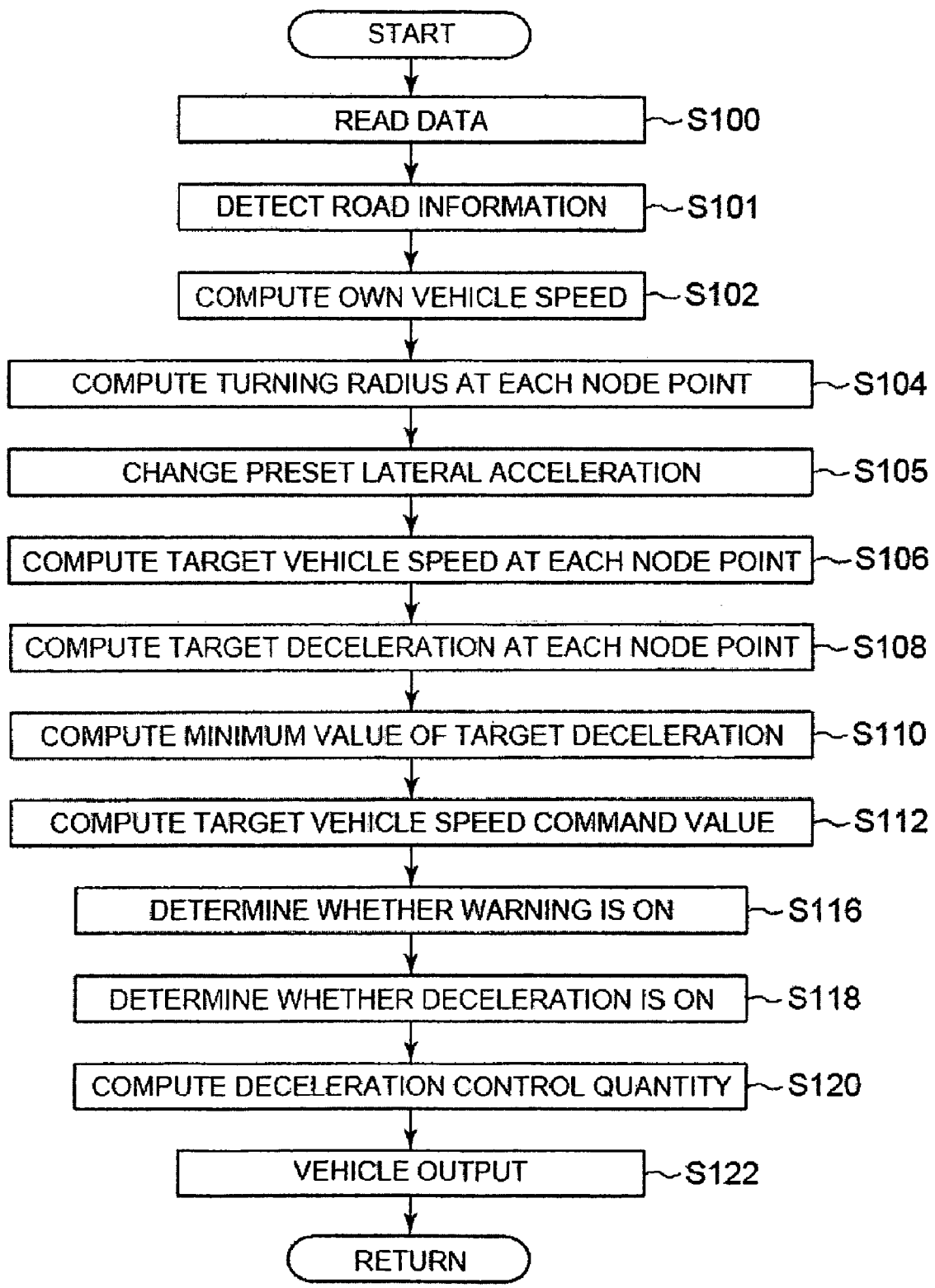
FIG. 3 is a flow chart illustrating an example of vehicle running control method according to an embodiment of the present invention.

FIG. 3 is a flow chart illustrating an example of operations performed by the embodiment of the present invention described above. Steps S100-S126 in this example are executed continuously at a prescribed interval based on the clock count provided by timer 16. Under the control of the controller 100 (e.g., CPU 13), when power is turned ON (the vehicle is started), the program for realizing the functions of the various parts is loaded. Then, after various types of data, input from the various sensors and systems via input port 11, are read in the initial step S100, flow proceeds sequentially to step S102 and the succeeding steps, and the prescribed processing is executed repeatedly at a prescribed interval.

In the operation of reading various types of data in the initial step S100, the specific operation is performed by reading the various wheel speeds Vwi (i=1-4), accelerator position A, lateral acceleration Yg*, switches attached to the steering wheel (MAIN, RES, SET, etc.), the navigation information from car navigation system 20, etc. As examples of the navigation information, in addition to the node point information $(X_j, Y_j, L_j, Branch_j)$ at the vehicle position (X, Y) and the various node points $N_j$ (j=1-n, n is an integer), road type and link type and other information about the road where the vehicle runs are also read at the same or substantially the same time. Among the node point information, $X_j, Y_j$ represent the coordinates of the node point, and $L_j$ represents the information about the distance from the vehicle position (X, Y) to the position of the node point $(X_j, Y_j)$. Also, with regard to the relationship among the various node points $N_j$ (j=1-n), the larger the value of j, the farther the vehicle is from node point $N_j$.

Then, in step S101, among the data read in step S100, for example, the road information about the road ahead of the vehicle is detected based on the navigation information obtained from car navigation system 20. More specifically, based on the road type and link type contained in the map information of the navigation information, a determination is made as to whether the road ahead of the vehicle is a highway or an ordinary road other than the highway (national roads, local roads, roads in suburban areas, and private roads). There is no specific restriction on the road type judgment standard. For example, when the road type is a toll road or higher grade, and the link type indicates the main road and feeder road are separate from each other, the road is determined to be a highway. On the other hand, when the road type is of a grade lower than a toll road, and the link type indicates the main road and feeder road not separate from each other, the road is determined to be an ordinary road other than a highway (hereinafter to be referred to as "ordinary road").

Vehicle speed V is computed in step S 102. According to this embodiment, in normal running, for example, it is assumed that the vehicle is rear-wheel drive, vehicle speed V is computed according to Equation (1) as the mean value of the front wheel speeds $Vw_1, Vw_2$:

$$V = (Vw_1 + Vw_2)/2 \tag{1}$$

Also, when a system using the vehicle speed, such as ABS control, is operated the vehicle speed (estimated vehicle speed) used in that system is used.

In step S104, turning radius $R_j$ at each node point $N_j$ is computed based on the node information of the navigation information read in the initial step S100. There are several methods for computing turning radius $R_j$ that can be adopted. In this example, turning radius $R_j$ is computed using the 3-point method that is commonly used. In addition to computing of turning radius $R_j$ at each node point $N_j$, are formed interpolation points equidistant in order to pass through the various node points $N_j$, and the turning radius $R_j$ at each interpolation point is computed.

Figure 4:
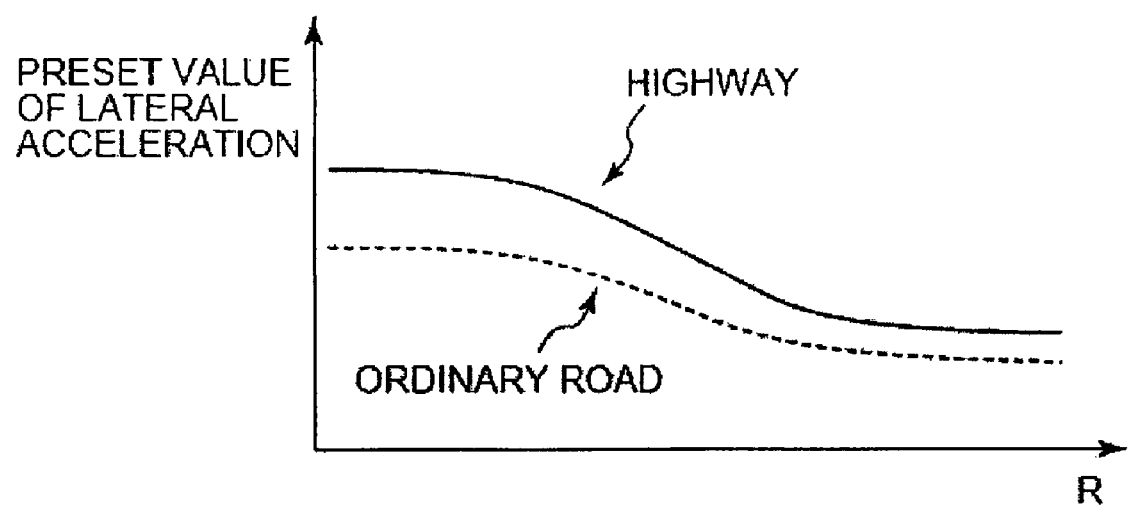
FIG. 4 is a diagram illustrating an example of the relationship between the lateral acceleration set value and the turning radius of the curve.

In step S105, the preset vehicle lateral acceleration is changed. For example, in step S101, when it is determined that the vehicle travels on an ordinary road, the lateral acceleration set value is lowered as indicated by the broken line in FIG. 4, and conversely, when it is determined that the vehicle travels on a highway, the lateral acceleration set value is raised as indicated by the solid line in FIG. 4. In FIG. 4, the abscissa represents turning radius R of the upcoming curve on the road where the vehicle runs.

In step S106, the target vehicle speed at each node point is computed. More specifically, turning radius $R_j$ and lateral acceleration Yg* at each node point $N_j$ obtained above are set at prescribed values. For example, the lateral acceleration Yg* can be set to 0.3 G. Also, any desired lateral acceleration can be set by the driver. The target vehicle speed $Vr_j$ at the node point $N_j$ can be computed using following Equation (2).

$$Vr_j^2 = Yg^* \times |R_j| \qquad (2)$$

According to this Equation (2), target vehicle speed $Vr_j$ becomes higher when turning radius $R_j$ is increased. Here, the target vehicle speed at each node point is set in step S106. However, just as in step S104, equidistant interpolation points are formed in order to pass through the various node points, and the target vehicle speed at each interpolation point can be computed.

In step S108, the target deceleration is computed at each node point. More specifically, target deceleration $Xgs_j$ at each node point can be computed by means of following Equation (3) using vehicle speed V, target vehicle speed $Vr_j$ at each node point, and distance $L_j$ from the current position to each node point.

$$Xgs_j = (V^2 - Vr_j^2)/(2 \times L_j) = (V^2 - Yg^* \times |R_j|)/(2 \times L_j) \qquad (3)$$

Here, the deceleration side is taken as positive for target deceleration $Xgs_j$. The value of target deceleration $Xgs_j$ is computed from vehicle speed V, target vehicle speed $Vr_j$, and distance $L_j$ from the current position to each node point. More specifically, the lower the target vehicle speed $Vr_j$, the smaller the turning radius $R_j$, or the smaller the distance $L_j$, the higher the target deceleration $Xgs_j$. In step S108, distance L to each node is used to compute the target deceleration at each node point. However, a scheme can also be adopted in which the distance to the equidistantly formed interpolation points is used to compute the target deceleration at each interpolation point.

In step S110, in order to detect a node point as the control object from the target deceleration values at the various node points, the minimum value of the target deceleration is computed using following Equation (4). More specifically, minimum value Xgs_min of the target deceleration at the various node points computed in step S108 is computed.

$$Xgs\_min = \min(Xgs_j) \qquad (4)$$

In step S112, from minimum value Xgs_min of the target deceleration computed in step S110, target vehicle speed command value Vrr associated with the deceleration's rate limiter is computed by means of following Equation (5).

$$Vrr = f(Xgs\_min) \times t \qquad (5)$$

Here, t represents time, and the rate limiter f, for example, is 0.01 G/sec.

In step S116, a determination is made as to whether warning operation should be started. More specifically, target vehicle speed command value Vrr computed in step S112, vehicle speed V and set vehicle speed Vset are used to judge whether to begin giving a warning. For example, as shown in FIG. 5, when set vehicle speed Vset=vehicle speed V, a warning is initiated when Vset=V>Vrr. In addition, warning ON flag flg_wow is set as flg_wow=1.

In step S118, a determination is made as to whether deceleration control should be turned ON. More specifically, target vehicle speed command value Vrr computed in step S112, vehicle speed V and set vehicle speed Vset are used to judge whether to start the deceleration control operation. For example, as shown in FIG. 6, when set vehicle speed Vset=vehicle speed V, if Vset=V>Vrr, deceleration control is performed. In addition, deceleration control ON flag flg_control is set as flg_control=1.

In step S120, the control quantity is computed for realizing target vehicle speed command value Vrr computed in step S112. To compute the control quantity, when deceleration control ON flag flg_control becomes flg_control=1, torque distribution to the engine torque and braking torque is performed in order to realize target vehicle speed command value Vrr computed in step S112, corresponding to the target deceleration computed by vehicle speed servo computing part 110 by means of torque distribution control computing part 111. Then the throttle opening command value for realizing the allotted engine torque and the brake hydraulic pressure control value for realizing the braking torque are output. For example, as shown in FIG. 6, when deceleration control ON flag flg_control becomes flg_control=1, the hydraulic pressure command value is output, and the brake control is turned ON.

In step S122, deceleration control and a warning are output to the vehicle. Here, examples of the warning include a beeping alarm, display on the HUD (Head-Up Display), a voice message from the speaker of the car navigation system, a display on the screen of the car navigation system, a meter display, etc.

In this embodiment, the turning radius of the upcoming curve is computed from the navigation information from car navigation system 20, and the target vehicle speed at each node point is set based on the computed turning radius at each node point and the preset lateral acceleration. After computing the target deceleration at each node point based on the target vehicle speed set at each node point and the vehicle speed measured using wheel speed sensor 21, the minimum value from the target deceleration values at the various node points is detected, the node point as the control object and the target deceleration are set, and the target vehicle speed command value for realizing the target vehicle speed at the node point serving as the control object is computed and output.

That is, in this embodiment, the road information pertaining to the road ahead of the vehicle is detected in step S101, and the lateral acceleration set value is changed for an ordinary road or a highway in step S105, so that the lateral acceleration set value can be appropriate to each type of road. Hence, the operations performed in step S105 can be viewed as, for example, a "deceleration control setting changing means." As a result, on an ordinary road for which these are significant discrepancies between the position and shape of a curve in the road ahead of the vehicle obtained from the navigation information or the like of car navigation system 20 and those of the actual curve, the lateral acceleration set value (deceleration control set value) is decreased so that the vehicle can pass through the curve at a reliable speed with the discrepancies taken into consideration.

For highways, there are usually few discrepancies between the position and shape of a curve of the road ahead of the vehicle obtained from the navigation information of car navigation system 20 and those of the actual curve. Consequently, it is possible to pass through the curve at the optimum speed without the driver feeling the vehicle is going too slow as the lateral acceleration set value (deceleration control set value) is set at any suitable value.

Another exemplary embodiment of the present invention will be explained with reference to FIG. 7. In this embodiment, the treatment is performed with basically the same or substantially the same flow as that of the embodiment discussed above, except that after the treatment of step S106 (computing the target vehicle speed at each node point), a new step S107 for target deceleration change treatment is added. Also, for example, the "deceleration control quantity" changed in the "deceleration control setting changing means" is the "target deceleration" in step S107 shown in FIG. 7, and the "deceleration control set value" is the "lateral acceleration set value" in step S105 in FIG. 3.

In step S107, the target deceleration for the vehicle is switched between the target deceleration for an ordinary road and that for a highway. For example, when it is determined that the road ahead of the vehicle detected in step S101 is an ordinary road, the target deceleration of the vehicle tends to change along the broken trend line indicated in FIG. 8. Conversely, when it is determined that the road ahead of the vehicle is a highway, the target deceleration of the vehicle tends to change along the solid line shown in FIG. 8. That is, when the vehicle runs on an ordinary road, the gain of the target deceleration is changed so that initially the target deceleration increases, and when running on a highway, the gain of the target deceleration is changed so that the target deceleration is uniform.

As a result, when the vehicle runs on an ordinary road the initial deceleration is increased so that the driver gets a clear sensation of deceleration, and the vehicle can pass through the curve easily. On the other hand, when the vehicle runs on a highway, deceleration is performed smoothly, so that the vehicle can run through the curve smoothly without hampering the traffic flow.

Another exemplary embodiment will now be explained. FIG. 9 is a flow chart illustrating an example of the operational flow of this embodiment. In this embodiment, the flow is basically the same or substantially the same as that in the embodiments discussed above. However, step S105 (change of set lateral acceleration) in the first embodiment discussed above and step S107 (change of target deceleration) in the second embodiment discussed above are omitted, and two new process steps, that is, step S113 (following/non-following switching) and step S114 (computing vehicle speed command value) are added after step S112 (target vehicle speed command value).

In step S113, when it is judged that the road ahead of the vehicle as detected in step S101 is an ordinary road, the preceding vehicle following function is turned ON to find any preceding vehicle traveling directly ahead of the vehicle, and when a preceding vehicle is detected, the vehicle speed command value that should be adopted for following a preceding vehicle is computed. On the other hand, if it is determined that the road ahead of the vehicle detected by step S101 is a highway and a preceding vehicle traveling directly ahead of the vehicle is detected by the preceding vehicle following function, a following target vehicle speed is computed, while a target vehicle speed is also computed from the navigation information. Then the different target vehicle speeds are compared, and the lower target vehicle speed is selected (select-low), and the vehicle speed command value is computed using that target vehicle speed.

Figure 10A:
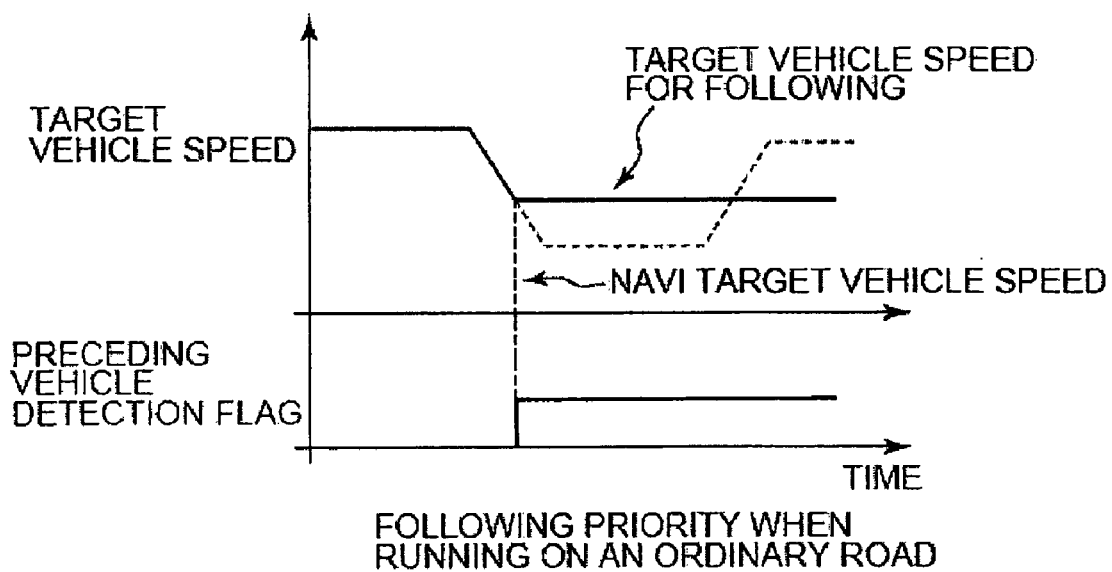
FIGS. 10A and 10B are diagrams illustrating examples of the relationship between the target vehicle speed on the ordinary road or highway and time.
Figure 10B:
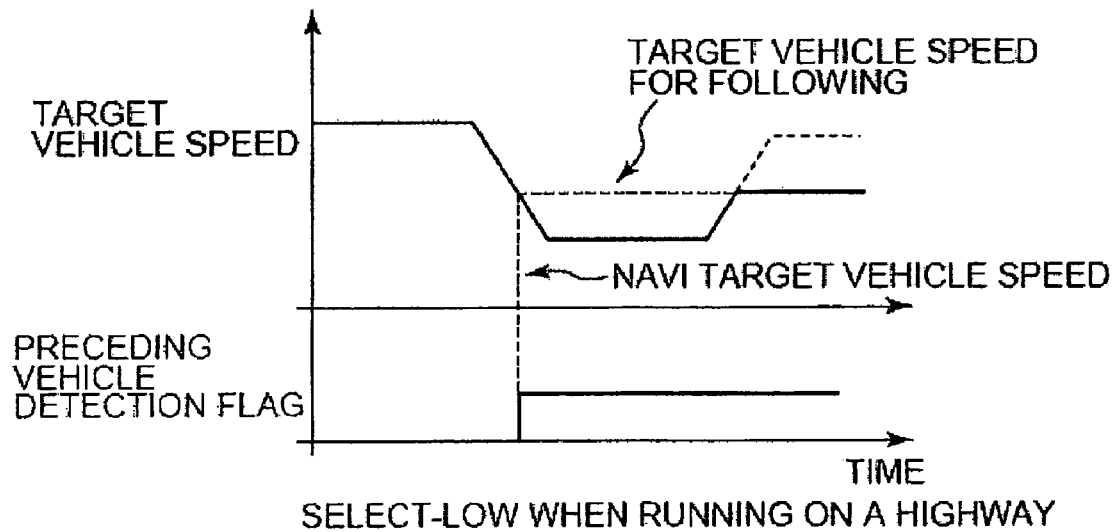

That is, the preceding vehicle ahead of the vehicle running on an ordinary road usually travels at a speed appropriate for the road, while the preceding vehicle ahead of the vehicle running on a highway usually travels too fast for the road. Consequently, when a preceding vehicle is detected while the vehicle is running on an ordinary road, as shown in FIG. 10A, a vehicle speed command value is output such that the target vehicle speed is the following target vehicle speed with following given priority. Conversely, when the vehicle runs on a highway, as shown in FIG. 10B, control is performed such that a vehicle speed command value is output based on selection of the lower vehicle speed of the target vehicle speed computed from the navigation information and the target vehicle speed for following the preceding vehicle is selected (select-low).

In the example shown in FIG. 10A, when a preceding vehicle is detected while running on an ordinary road, even if the following target vehicle speed with respect to the preceding vehicle (solid line in the figure) is higher than the target vehicle speed computed from the navigation information (broken line in the figure), the following target vehicle speed is still selected as having priority. On the contrary, as shown in FIG. 10B, when a preceding vehicle is detected while running on a highway, the following target vehicle speed with respect to the preceding vehicle (broken line in the figure) and the target vehicle speed computed from the navigation information (solid line in the figure) are compared with each other, and the lower target vehicle speed is always selected, that is, the select-low scheme is adopted in this example. That is, when the preceding vehicle is detected, if the target vehicle speed computed from the navigation information is lower, this target vehicle speed is selected. However, if the target vehicle speed computed from the navigation information exceeds the following target vehicle speed, the following target vehicle speed is selected as having priority in this example.

As explained above, in this embodiment, switching is performed between the operation and non-following operation according to the road information. Consequently, when running on a highway, instead of following the preceding vehicle traveling too fast with respect to a curve, the vehicle can pass through the curve at an appropriate speed. On the other hand, on an ordinary road, the vehicle can pass through the curve at an appropriate speed with following having priority. In the aforementioned example embodiment, the treatment of step S105 (change in lateral acceleration setting) and the treatment of step S107 (change in target deceleration) are omitted. However, a technique can also be adopted in which the processing of process steps S105 and S107 are included.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A vehicle driving control system comprising:
   a curve state detecting device is configured to detect a curve state in a road ahead based on acquired navigation information;
   a target vehicle speed computing device is configured to compute a target vehicle speed for the vehicle at an upcoming curve based on the upcoming curve state, detected by said curve state detecting device, and a preset lateral acceleration set value;
   a target deceleration computing device is configured to compute a target deceleration at a current travel position of the vehicle based on the target vehicle speed computed by said target vehicle speed computing device;
   a target vehicle speed command value computing device is configured to compute a target vehicle speed command value based on the target deceleration computed by said target deceleration computing device;
   a road classification detecting device is configured to detect road classification of the road ahead of the vehicle;
   a deceleration control setting changing device is configured to change a deceleration control quantity or a deceleration control set value according to the road classification detected by said road detecting device, wherein the target vehicle speed is changed to be lower when the road classification indicates that the road ahead of the vehicle is a road for which map information has lower accuracy than when the road classification indicates that the road ahead of the vehicle is a road for which map information has a higher accuracy; and a preceding vehicle following device based on which the vehicle follows a preceding vehicle traveling ahead of the vehicle, wherein according to the classification of the road ahead of the vehicle detected by the road classification detecting device, the deceleration control setting changing device is arranged to make use of the preceding vehicle following device to control the running of the vehicle.

2. The vehicle driving control system as claimed in claim 1, wherein:
said road classification detecting device detects the road classification for the road ahead of the vehicle based on a road type or junction type contained in said navigation information.

3. The vehicle driving control system as claimed in claim 1, wherein:
the deceleration control set value changed by said deceleration control setting changing device is said preset lateral acceleration set value for the vehicle.

4. The vehicle driving control system as claimed in claim 3, wherein:
said deceleration control setting changing device changes said preset lateral acceleration set value for the vehicle to be higher for a highway than for an ordinary road other than a highway.

5. The vehicle driving control system as claimed in claim 1, wherein
the deceleration control quantity changed by said deceleration control setting changing device is a gain of the target deceleration computed by said target deceleration computing device.

6. The vehicle driving control system as claimed in claim 5, wherein:
said deceleration control setting changing device changes the gain of the target deceleration computed by said target deceleration computing device so that the gain for an ordinary road other than a highway is higher than that for a highway.

7. The vehicle driving control system as claimed in claim 1, wherein:
said deceleration control setting changing device operates such that when the road ahead of the vehicle detected by said road classification detecting device is an ordinary road, the vehicle follows the preceding vehicle in accordance with said preceding vehicle following device, and when said road ahead of the vehicle is a highway, said deceleration control setting changing device compares the target vehicle speed computed with said target vehicle speed computing device and the target vehicle speed with respect to the preceding vehicle computed by said preceding vehicle following device, and the lower of these target vehicle speeds is selected as the target vehicle speed in performing running control of the vehicle.

8. The vehicle driving control system as claimed in claim 1, wherein:
a car navigation system provides said navigation information has a wheel speed detecting device that provides a wheel speed information, and an
acceleration/deceleration control device that performs acceleration/deceleration of the vehicle based on a control instruction.

9. A vehicle driving control method comprising:
detecting, by a curve state detecting device, a curve state for a road ahead of the vehicle where the vehicle will travel under guidance by a car navigation system;
computing, by a target vehicle speed computing device, a target vehicle speed of the vehicle in an upcoming curve based on a detected state of the upcoming curve and a preset lateral acceleration set value of the vehicle;
computing, by a target deceleration computing device, a target deceleration at a current travel position based on the target vehicle speed, computing, by a target vehicle speed command value computing device, a target vehicle speed command value based on said target deceleration, and sending a command for deceleration of the vehicle in accordance with the computed target vehicle speed;
detecting, by a road classification detecting device, road classification about the road ahead of the vehicle based on navigation information of said car navigation system;
changing, by a deceleration control setting changing device, at least one of said preset lateral acceleration set value and said computed target deceleration based on the detected road classification, wherein the target vehicle speed is changed to be lower when the road classification indicates that the road ahead of the vehicle is a road for which map information has lower accuracy than when the road classification indicates that the road ahead of the vehicle is a road for which map information has a higher accuracy; and
wherein, according to the detected classification of the road ahead of the vehicle, a preceding vehicle following device based on which the vehicle follows a preceding vehicle traveling ahead of the vehicle is used to control the running of the vehicle.

10. The vehicle driving control method as claimed in claim 9, wherein:
said road classification is the detected road classification for the road ahead of the vehicle based on the road classification or junction classification contained in said navigation information.

11. The vehicle driving control method as claimed in claim 9, wherein:
said preset lateral acceleration set value is changed to be higher for a highway than for an ordinary road other than a highway.

12. The vehicle driving control method as claimed in claim 9, wherein:
a gain of said target deceleration is changed so that it is higher for an ordinary road other than a highway, than for a highway.

13. The vehicle driving control method as claimed in claim 9, further comprising:
controlling the vehicle to follow the preceding vehicle running ahead of the vehicle; and
when the road ahead of the vehicle detected based on the navigation information of said car navigation system is an ordinary road other than a highway, a following operation by the vehicle is given priority; when the road ahead of the vehicle is the highway, the target vehicle speed computed and the target vehicle speed with respect to the preceding vehicle are compared with each other, and the lower of these target vehicle speeds is selected to perform running control of the vehicle.

14. A vehicle driving control system comprising:
curve state detecting means is configured to detect a curve state in a road ahead based on acquired navigation information;
target vehicle speed computing means is configured to compute a target vehicle speed for the vehicle at an upcoming curve based on an upcoming curve state, detected by said curve state detecting means, and a preset lateral acceleration set value;

target deceleration computing means is configured to compute a target deceleration at a current travel position of the vehicle based on the target vehicle speed computed by said target vehicle speed computing means;

target vehicle speed command value computing means is configured to compute a target vehicle speed command value for a deceleration control means based on the target deceleration computed by said target deceleration computing means;

road classification detecting means is configured to detect road classification for the road ahead of the vehicle;

deceleration control setting changing means is configured to change a deceleration control quantity or a deceleration control set value according to the road classification detected by said road classification detecting means, wherein the target vehicle speed is changed to be lower when the road classification indicates that the road ahead of the vehicle is a road for which map information has lower accuracy than when the road classification indicates that the road ahead of the vehicle is a road for which map information has a higher accuracy; and a preceding vehicle following means based on which the vehicle follows a preceding vehicle traveling ahead of the vehicle; wherein according to the classification of the road ahead of the vehicle detected by the road classification detecting means, the deceleration control setting changing means is arranged to make use of the preceding vehicle following means to control the running of the vehicle.

15. A vehicle driving control system comprising:

a car navigation system is configured to provide navigation information;

a driving road detector is configured to detect a position of a driving road based on said navigation information;

a curve condition detector is configured to detect forward curve condition based on said navigation information;

a target vehicle speed calculator is configured to calculate a target vehicle speed based on said forward curve condition and a preset lateral acceleration set value of the vehicle;

a target deceleration value calculator is configured to calculate a target deceleration based on said target vehicle speed and a vehicle present position from the driving road detector;

a target vehicle speed command value calculator is configured to calculate a target vehicle speed command value based on said target vehicle deceleration;

a road classification detector is configured to detect forward curve road classification on said navigation information;

a deceleration corrector is configured to correct said target vehicle speed command value based on said forward curve road classification;

a deceleration controller is configured to control a vehicle speed based on said target deceleration command value, wherein the target vehicle speed is changed to be lower when the road classification indicates that the road ahead of the vehicle is a road for which map information has lower accuracy than when the road classification indicates that the road ahead of the vehicle is a road for which map information has a higher accuracy; and a preceding vehicle detector based on which the vehicle follows a preceding vehicle traveling ahead of the vehicle; wherein according to the classification of the road ahead of the vehicle detected with the road classification detector, the deceleration controller is arranged to make use of the preceding vehicle detector to control the running of the vehicle.

\* \* \* \* \*